NEGABINARY ADDERS AND SUBTRACTORS

Filed Sept. 10, 1965 6 Sheets-Sheet 1

NOR CIRCUIT

R-S-T FLIP-FLOP

DELAY LINE

HALF-ADDER

HALF-SUBTRACTOR

HALF-CO-ADDER

NEGABINARY COUNTER STAGE
UP FOR EVEN i
DOWN FOR ODD i

NEGABINARY COUNTER STAGE
UP FOR ODD i
DOWN FOR EVEN i

INVENTOR

MAURITS PIETER DEREGT

BY

Scrivener Parker Scrivener & Clarke

ATTORNEYS

NEGABINARY UP-DOWN COUNTER STAGE

FOUR-STAGE NEGABINARY UP-COUNTER

FOUR-STAGE NEGABINARY DOWN COUNTER

INVENTOR

MAURITS PIETER DEREGT

BY

Scrivener Parker Scrivener & Clarke

ATTORNEYS

INVENTOR
MAURITS PIETER DEREGT
BY
Scrivener Parker Scrivener & Clarke
ATTORNEYS

INVENTOR
MAURITS PIETER DEREGT
BY
Scrivener Parker Scrivener & Clarke
ATTORNEYS

NEGABINARY ADDERS AND SUBTRACTORS

Filed Sept. 10, 1965 6 Sheets-Sheet 5

INVENTOR

MAURITS PIETER DEREGT

BY

*Scrivener Parker Scrivener & Clarke*

ATTORNEYS

June 18, 1968 M. P. DEREGT 3,389,245

NEGABINARY ADDERS AND SUBTRACTORS

Filed Sept. 10, 1965 6 Sheets-Sheet 6

INVENTOR

MAURITS PIETER DEREGT

BY

*Scrivener Parker Scrivener & Clarke*

ATTORNEYS

United States Patent Office 3,389,245
Patented June 18, 1968

3,389,245

NEGABINARY ADDERS AND SUBTRACTORS

Maurits Pieter Deregt, 6528 Jay Miller Drive,
Falls Church, Va. 22041

Continuation-in-part of application Ser. No. 389,760, Aug. 14, 1964. This application Sept. 10, 1965, Ser. No. 486,347
5 Claims. (Cl. 235—175)

ABSTRACT OF THE DISCLOSURE

An apparatus using electronic, fluidic, cryogenic or other means for performing arithmetic operations upon two numbers expressed in negative radix notation, wherein the choice of operation may depend on the interconnection and arrangement of a plurality of identical logic circuits, or on the nature of the input signals and the choice of output terminals of each of a plurality of identical stages, or on externally-applied control signals to each of a plurality of identical stages. The apparatus also provides for detection of both negative and positive register overflow situations by appending either two additional identical stages, or two special stages.

This application is a continuation-in-part of copending application Ser. No. 389,760, filed Aug. 14, 1964.

This invention relates to calculating elements for digital computers, including those commonly known as general purpose computers (GPC) and digital differential analyzers (DDA). Although these calculating elements are spoken of as though part of an electronic computing apparatus, it will be recognized that they may be used in computing apparatus making use of information storing devices, logic devices and information-carrying signals other than electronic. The devices described in Ser. No. 389,760 are for computation in a number system whose radix is −2. This system will be referred to hereinafter as the negabinary system and numbers expressed in that system will be referred to as negabinary numbers. The explanation of such systems included in application Ser. No. 389,760 will not be repeated in this application. The outstanding characteristic of the negabinary and negabinary-coded systems is the simplification in computer circuitry made possible by the elimination of the sign or polarity-indicating conventions necessary in number systems currently in use.

Still another object of this invention is to provide a circuit which will perform the function of either an adder or of a subtractor, the only difference being in whether the true or false Boolean value of the addend or minuend digit is selected as one input. Still another object is to provide an adder-subtractor, making use of the same circuit, such that the desired operation may be selected with given control signals.

Each of the foregoing described circuits may be joined with identical units to provide means of obtaining arithmetic sums and differences of negabinary numbers each comprising a multiplicity of digits. Still another object of this invention is to provide such circuits, each comprising a multiplicity of stages to operate upon complete negabinary numbers in true form, to produce resulting negabinary numbers also in true form.

Logic circuits, comprising the circuits referred to above, are described in many reference works. Examples of computer circuits using AND and OR logic elements are given in "Arithmetic Operations in Digital Computers," by R. K. Richards, published in 1955 by D. Van Nostrand Company. A list of these and other logic circuits is given on page 160 of "Digital Computer Design Fundamentals," by Yaohan Chu, published by the McGraw-Hill Book Co., Inc., in 1962. Various embodiments of these logic circuits are given on pages 160–307. Embodiments making use of fluid means of transferring signals are explained on pages 80–88 of the December 1964 issue of the Scientific American.

Computer circuits comprising logic elements can be synthesized by using Boolean Algebra. This method, which is used to develop and synthesize the circuits previously mentioned, is fully explained on pages 26–50 of Richards and on pages 89–132 of Chu. The Boolean functions referred to in the following explanations will be given in both "canonical" and in "minimized" sum-of-products form. The minimization of Boolean functions is fully explained in pages 136–156 of Chu.

As explained on these pages, each Boolean function may be represented in a graphical manner by making use of a Vietch diagram (also called a Karnough map). While only one Vietch diagram corresponds to a given Boolean function, the function itself can be expressed in many different algebraic forms. Each algebraic form corresponds to a mechanization of AND, OR, and NOT logic circuits, as explained on page 33 of Richard's text. Likewise, each Boolean function may be mechanized using other logic circuits such as NOR or NAND.

The truth table for some common logic operations, and their symbols, for two Boolean variables is shown in Table I.

From Table I below, the following Boolean algebraic functions can be written:

$$X \oplus Y = X\bar{Y} \oplus \bar{X}Y$$

$$X/Y = \overline{X \cdot Y} = \bar{X} + \bar{Y}$$

$$X \swarrow Y = \overline{X+Y} = \bar{X} \cdot \bar{Y}$$

TABLE I

| Operation Name | Symbols | Truth Table |
|---|---|---|
| ——— | X | 0 1 0 1 |
| ——— | Y | 0 0 1 1 |
| NOT | $\bar{X}$ | 1 0 1 0 |
| NOT | $\bar{Y}$ | 1 1 0 0 |
| AND | X·Y, XY | 0 0 0 1 |
| OR | X+Y | 0 1 1 1 |
| EXCLUSIVE OR | X⊕Y | 0 1 1 0 |
| NAND | X/Y | 1 1 1 0 |
| NOR | X↙Y | 1 0 0 0 |

Each Boolean variable refers to a signal which is an input to or an output from a circuit mechanization to perform a given arithmetic function. There is one basic variable for each operand; for each digit, the basic variable will be subscripted with a number indicative of the digit position. To simplify notation, however, the Boolean functions in general will be written without subscripts. The variables on the right-hand side of the equal sign are inputs to the corresponding circuit; the variable on the left is an output. Thus, to write the corresponding Boolean function with subscripts, place an "$i$" as subscript to all unsubscripted variables and replace the subscript "out" with "$i$+1."

Example:

$$R = A \oplus D$$
$$C_{out} = AD$$

as used to express Boolean functions is identical to:

$$R_i = A_i \oplus D_i$$
$$C_{i+1} = A_i D_i$$

which are the functions using the symbols of the diagrams.

In the discussion and diagrams, the notation used in referring to operands and stages is directly related to the mathematical notation commonly used to describe positional number systems. Hence, $A_0 (i=0)$ represents the low order digit (the "units" digit); $A_{-1}$ represents the first digit to the right of the radix point; $A_{n-1}$ represents the high order digit of an $n$-digit number.

| Symbol: | Meaning |
|---|---|
| A, $A_i$ | Augend, Minuend, or a first operand. |
| D, $D_i$ | Addend, Subtrahend, or a second operand. |
| K, $K_i$ | A third operand. |
| L, $L_i$ | A fourth operand. |
| B, $B_i$ | Carry-in of −1 ("Borrow") to Stage $i$. |
| C, $C_i$ | Carry-in of +1 ("Carry") to Stage $i$. |
| $B_{out}$, $B_{i+1}$ | Carry-out of −1 from Stage $i$. |
| $C_{out}$, $C_{i+1}$ | Carry-out of +1 from Stage $i$. |
| R, $R_i$ | Input to R (reset) terminal of R–S or R–S–T flipflop; Boolean complement of true circuit output. |
| S, $S_i$ | Input to S (set) terminal of R–S or R–S–T flipflop; true output of sum, difference, or result of circuit operation. |
| T, $T_i$ | Input to T (trigger) terminal of T or R–S–T flipflop; output of circuit to operate T terminal of a flipflop. |
| N, $N_i$ | Negative Detect Carry-in to odd stage. |
| P, $P_i$ | Positive Detect Carry-in to even stage. |
| Add | Control signal for addition: "Add." |
| Sub | Control signal for subtraction: "Subtract." |
| $i$, $j$ | Stage or order number, corresponding to the power of the radix of the digit position. |
| $n$ or $m$ | The total number of digits in an operand. |

In describing counters and other devices using bi-stable state storage registers, R–S–T flipflops will be used, since the operation of these flipflops is easy to trace. A signal at the R input terminal (RESET) will cause the flipflop to be reset to the ZERO value; a signal at the S input terminal (SET) will cause the flipflop to assume the ONE value; and a signal at the T terminal (TRIGGER) will cause the flipflop to change its value. The operation of this and the T, the R–S, and the J–K flipflops is explained more fully on pages 127–130 of Chu.

Several embodiments of the invention referred to above, making use of NOR and other logic circuits and R–S–T flipflops, are described hereinbelow and are shown in the drawings. It is understood that these drawings are illustrations and examples of preferred embodiments of the invention; they are not definitions of limits of the invention.

Figure 1A:
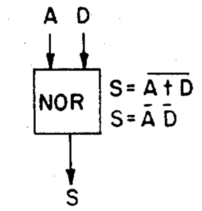
FIGURE 1A shows the symbol for the NOR logic module, together with the Boolean function variables as inputs and output.
Figure 1B:
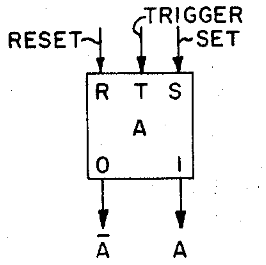
FIGURE 1B shows the symbol which will be used herein to represent R–S–T flipflop.
Figure 1C:
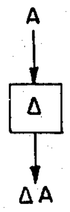
FIGURE 1C is the symbol for a delay line, in which the output signal is identical to the input signal but occurs a fixed time interval later.
Figure 1D:
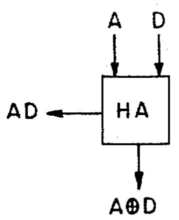
FIGURE 1D is the symbol for a binary half-adder, which preforms the arithmetic function $A+D$ on corresponding digits of the binary operands, producing a binary sum output digit and a carry output.
Figure 1E:
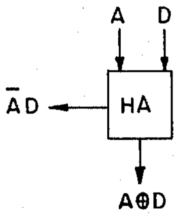
FIGURE 1E is the symbol for a binary half-subtractor, which performs the arithmetic function $A-D$ on corresponding digits of the binary operands, producing a sum output digit and a carry output.
Figure 1F:
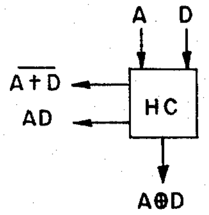
Figure 2A:
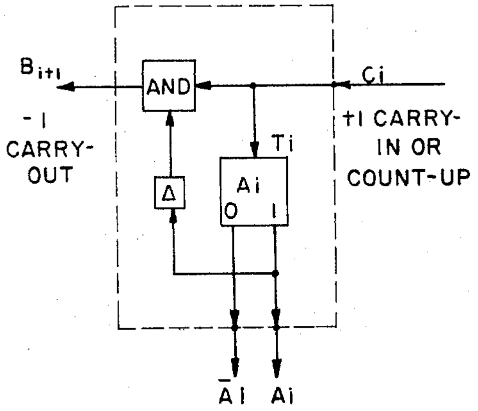
Figure 2B:
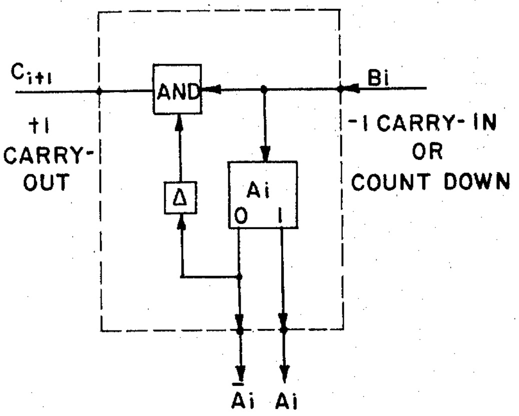
Figure 2C:
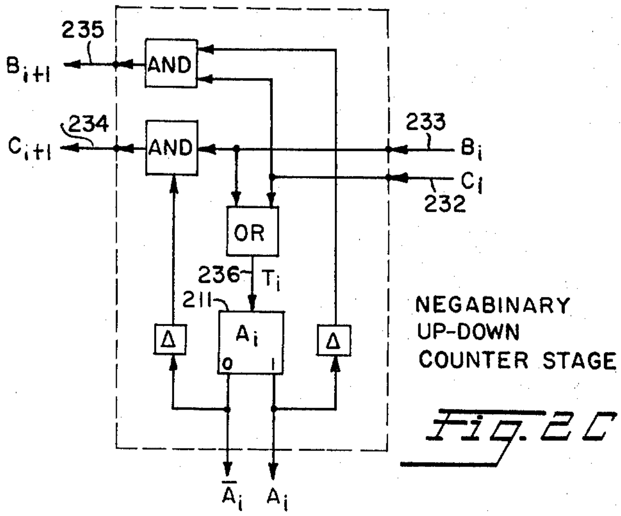
Figure 2D:
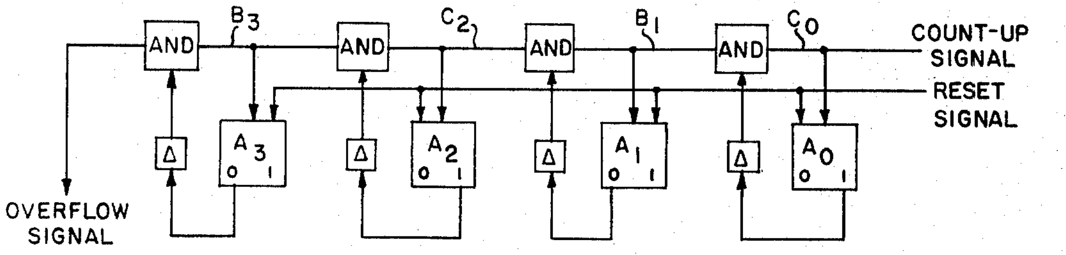
Figure 2E:
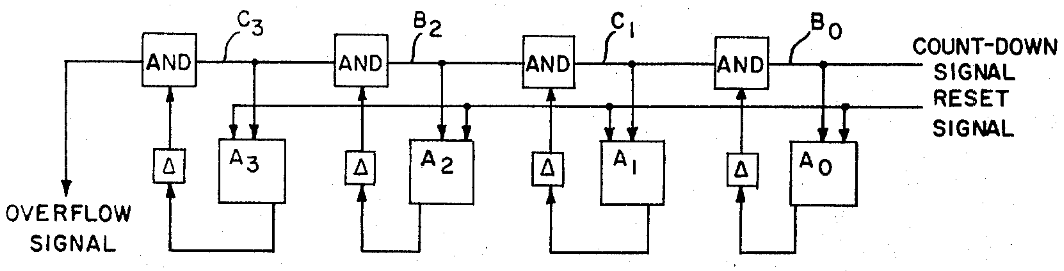
Figure 3A:
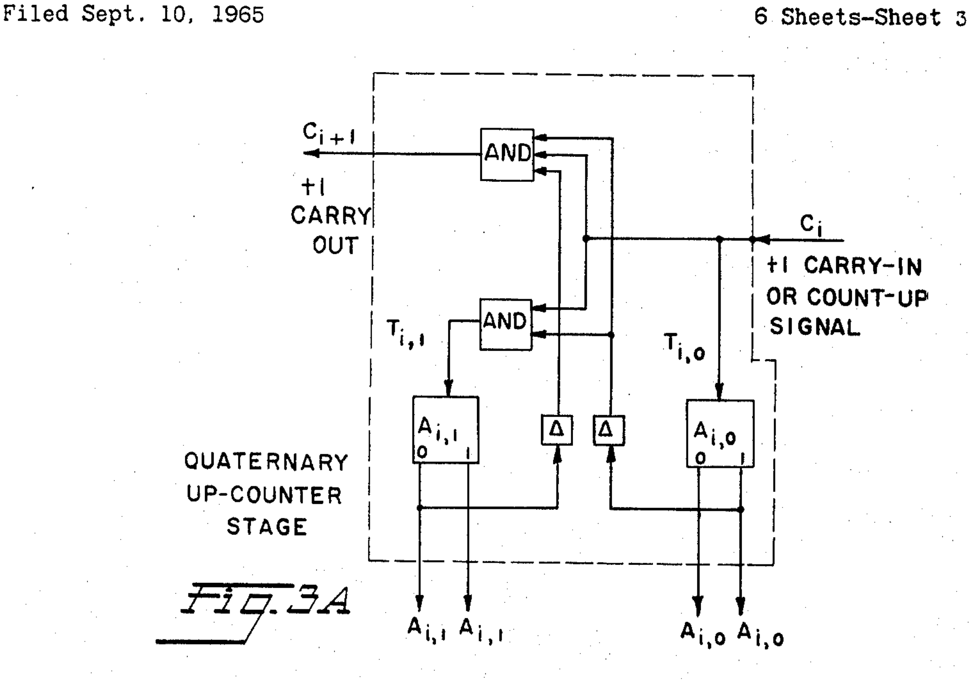
Figure 3B:
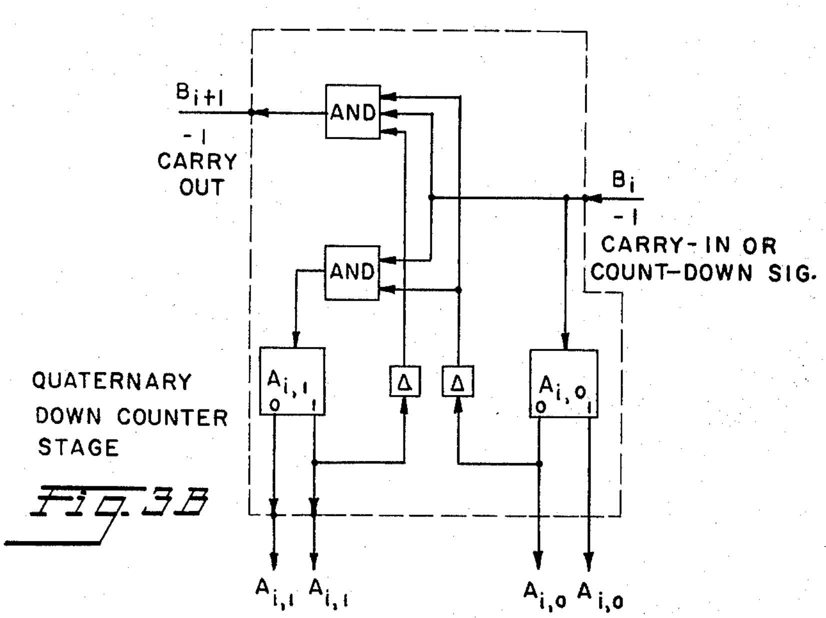
Figure 3C:
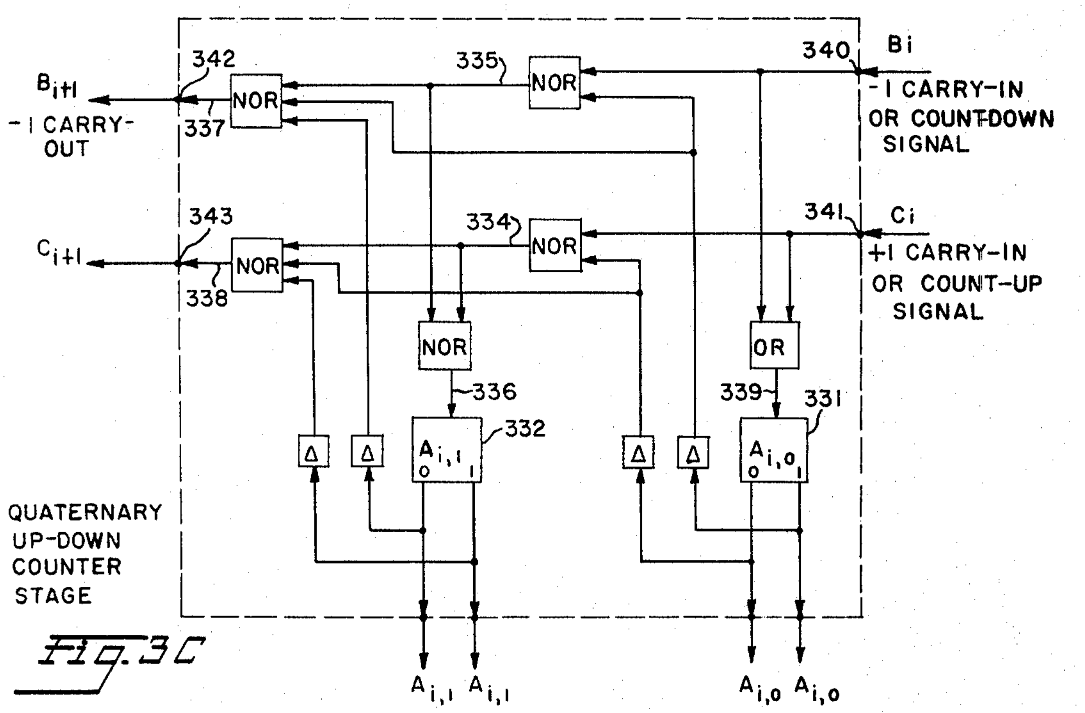
Figure 3D:
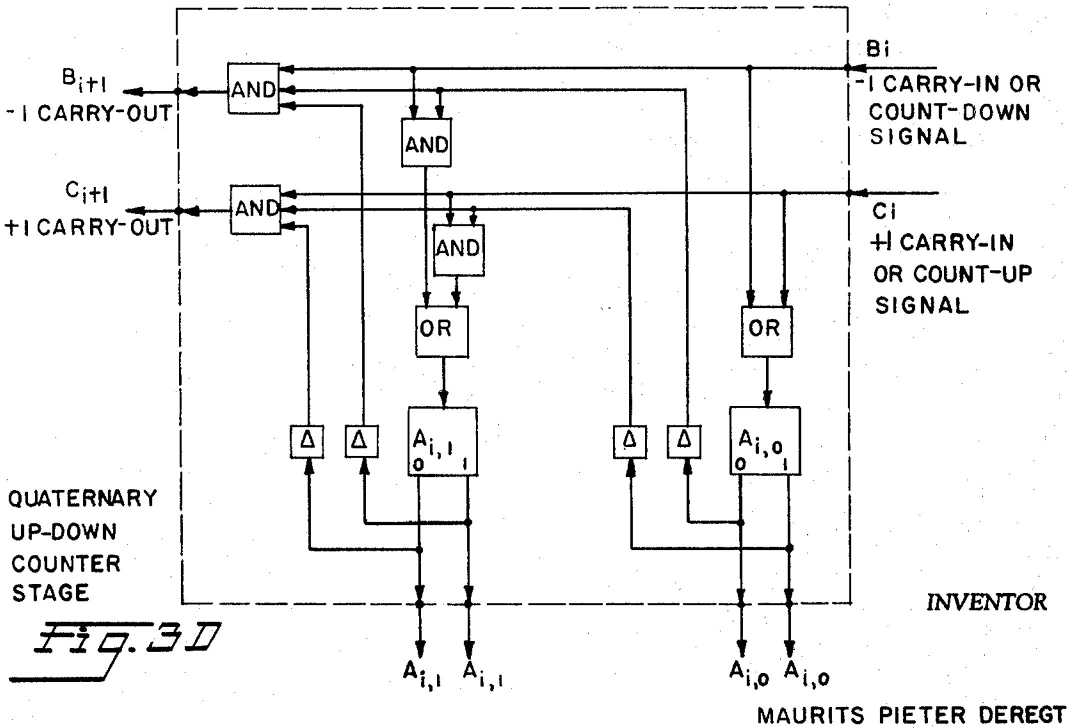
Figures 4A, 4B, 5:
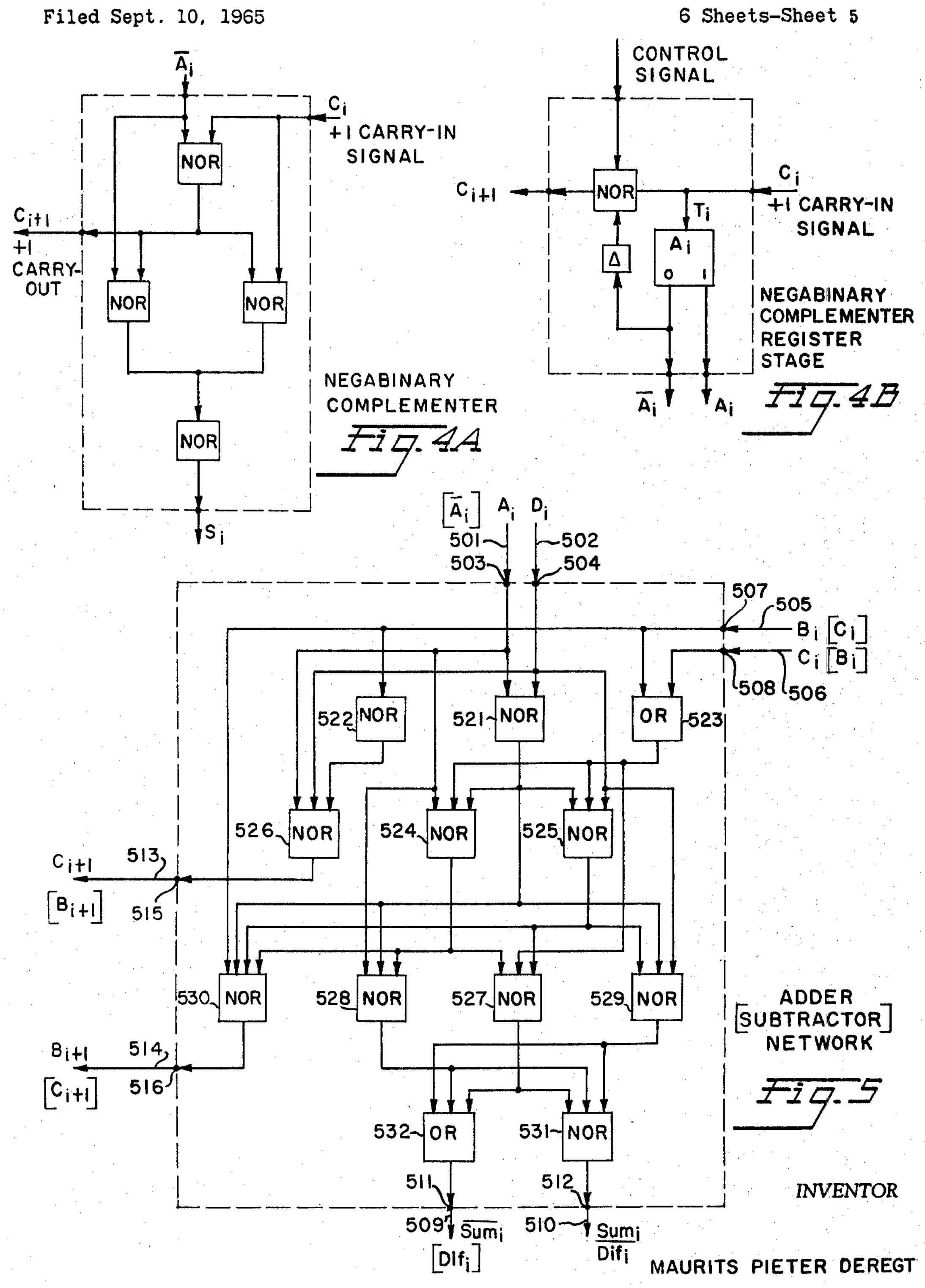
Figure 6A:
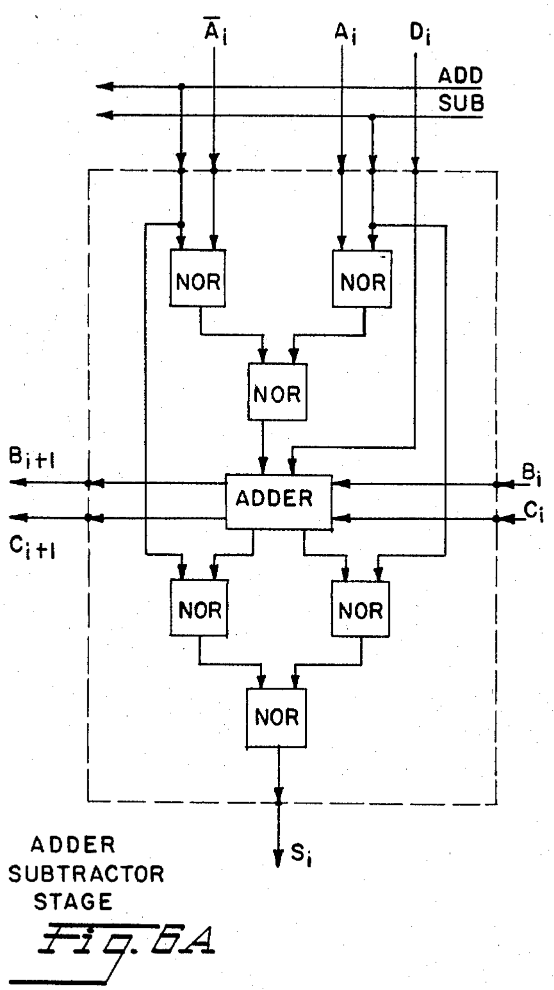
Figure 6B:
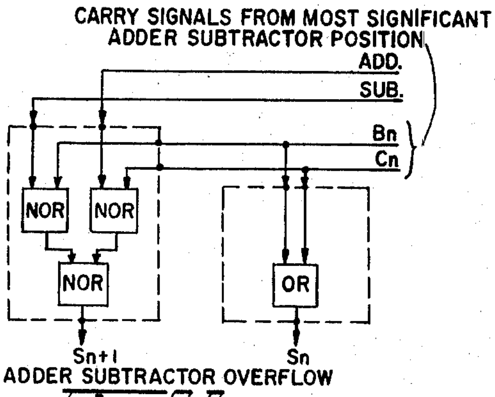
Figure 7A:
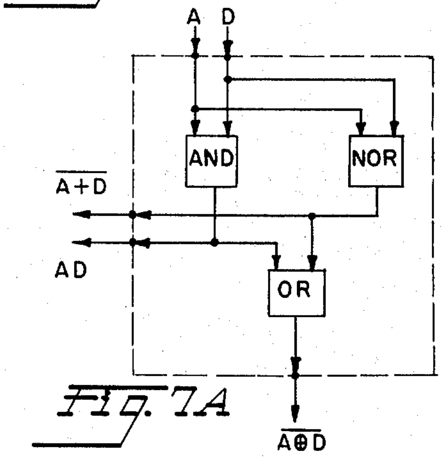
Figure 7B:
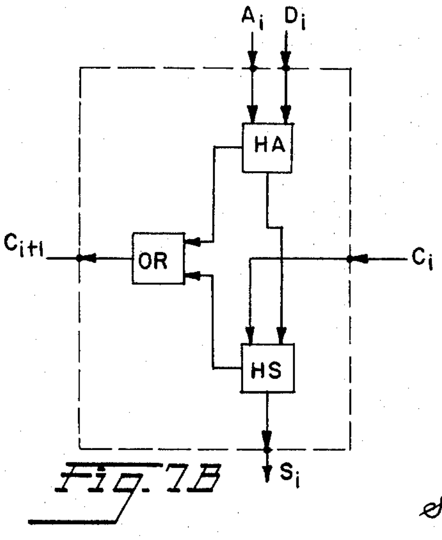
Figure 7C:
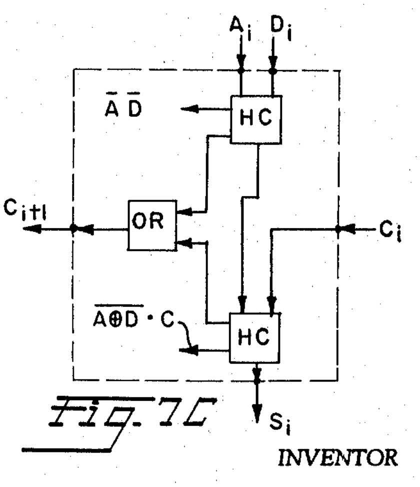

FIGURE 1F is the symbol which will be used herein to represent the circuit for a negabinary half-co-adder, described more fully hereinafter, which performs the arithmetic function $-(A+D)$ on the corresponding digits of the negabinary operands, producing the negation of the signal representative of the sum digit, the negation of the signal representive of the carry digit, and a third output signal;

FIGURE 2A is a block diagram of one stage of a negabinary up-counter;

FIGURE 2B is a block diagram of one stage of a negabinary down-counter;

FIGURE 2C is a block diagram of one stage of a negabinary up-down counter;

FIGURE 2D is a block diagram of four stages of a parallel negabinary up-counter illustrating the overflow and RESET signal circuitry;

FIGURE 2E is a block diagram of four stages of a parallel negabinary down-counter;

FIGURE 3A is a block diagram of one stage of a quaternary up-counter in which a two-bit negabinary code is used to represent the four quaternary digits −2, −1, 0, +1;

FIGURE 3B is a block diagram of one stage of a quarternary down-counter;

FIGURE 3C is a block diagram of one stage of a quarternary up-down counter;

FIGURE 3D is a block diagram of one stage of a second quarternary up-down counter;

FIGURE 4A is one stage of a negabinary complementing circuit using NOR logic modules;

FIGURE 4B is a block diagram of one stage of multistage register comprising R–S–T registers and logic circuitry to complement a multi-digit negabinary number stored in the register;

FIGURE 5 is a block diagram of a logic network capable of performing either negabinary addition or subtraction upon corresponding digits of two negabinary operands and a carry-in digit;

FIGURE 6A is a block diagram of a negabinary full adder-subtractor;

FIGURE 6B is a block diagram of the overflow stages of a negabinary adder-subtractor;

FIGURE 7A is a block diagram of a negabinary half co-adder;

FIGURE 7B is a block diagram of a negabinary full co-adder comprising a binary half-adder, a binary half-subtractor, and an OR circuit;

FIGURE 7C is a block diagram of a negabinary full co-adder comprising two negabinary half co-adders and an OR circuit.

It will be understood that FIGS. 1A to 1F, inclusive, illustrate symbols which are used in other figures of the drawings and do not illustrate computer circuits forming part of the invention. The foregoing description and explanation of these figures are therefore believed to be sufficient for the purposes of this specification and the appended claims.

NEGABINARY-CODED QUATERNARY NOTATION

In negabinary notation, a sequence of four digits $$d_4 d_3 d_2 d_1 d_0$$

represents the quantity $$d_4(-2)^4+d_3(-2)^3+d_2(-2)^2+d_1(-2)+d_0$$

These terms can be grouped in pairs; numbers with an odd quantity of digits can be preceded by a zero.

$$[0(-2)^5+d_4(-2)^4]+[d_3(-2)^3+d_2(-2)^2]+[d_1(-2)+d_0]$$

These terms can be factored to give the following expression:

$$[0(-2)+d_4](-2)^4+[d_3(-2)+d_2](-2)^2+[d_1(-2)+d_0]$$
$$(0+d_4)(4)^2+(-2d_3+d_2)(4)+(-2d_1+d_0)$$

Each pair of negabinary digits thus can be considered to represent one digit in the system whose base is +4, which is the quaternary scale of notation. There are four combinations of two negabinary digits; these have the decimal values shown in Table II.

TABLE II

| Negabinary Digits | Decimal Value | Quaternary Digits |
|---|---|---|
| 10 | −2 | $\bar{2}$ |
| 11 | −1 | $\bar{1}$ |
| 00 | 0 | 0 |
| 01 | +1 | 1 |

The four digits of this binary-coded quaternary system are thus −2, −1, 0, +1, represented respectively by $\bar{2}$, $\bar{1}$, 0, 1. Any negabinary number can be considered a quaternary number but thus pairing off negabinary digits starting with the radix point. Thus the negabinary number 10, 001, 101, can be paired off to 10, 00, 11, 01, which is the negabinary-coded equivalent for the quaternary number $\bar{2}0\bar{1}1$:

$$\bar{2}(4)^3+0(4)^2+\bar{1}(4)+1$$

This is equal to −131 in decimal notation.

It is evident that a negabinary coded number system uses two bases: the primary system in which the digits are in the encoded form; and the secondary or auxiliary system, in which each digit of the primary system is encoded by means of negabinary digits. It is convenient, therefore, to extend the previous notation used to designate operands and stages. This will be done by using the subscript $i$ to denote a digit position in the primary system, and adding the subscript $j$ to indicate a digit position in the secondary system, such that $j$ is the power of the secondary radix of that position. A negabinary coded quaternary number of four digits may thus be designated $$d_{3,1}d_{3,0}d_{2,1}d_{2,0}d_{1,1}d_{1,0}d_{0,1}d_{0,0}$$

in which each pair of negabinary digits comprise one quaternary digit.

Although this system has a positive base, it makes use of digits with intrinsically negative value; therefore, the same advantages of not requiring separate sign conventions and algorithms apply. This suggests computer circuits based on the quaternary system (+4), the negoctal (−8), the hexadecimal (+16) and others, having the identical advantages of a negabinary system. Certain of the circuits of the present invention are based on this system.

If the negabinary system upon which the quaternary code is based makes use of digits having the values 0 and −1 instead of 0 and +1, as developed above, the digits of the quaternary system would be −1, 0, 1, 2.

ARITHMETIC OPERATIONS

The operations to be considered in the present invention include counting, complementation, addition, and subtraction.

*Counting*

As in normal binary, the number of combinations which $n$ bits can assume is $2^n$. In negabinary notation, some of these will have a negative value, some a positive. In order to proceed through all possible combinations in sequence without overflow, the counting process must start with the representation of lowest value. In normal binary, this is a string of zeroes. In negabinary, it is a string of alternating 1's and 0's with the 1's in odd $i$ positions. Table III gives the full sequence for $n=3$, with normal binary and decimal equivalents.

TABLE III

| Decimal Value | Binary | Negabinary |
|---|---|---|
| −2 | ---------- | 010 |
| −1 | ---------- | 011 |
| 0 | 000 | 000 |
| +1 | 001 | 001 |
| +2 | 010 | 110 |
| +3 | 011 | 111 |
| +4 | 100 | 100 |
| +5 | 101 | 101 |
| +6 | 110 | ---------- |
| +7 | 111 | ---------- |

While Table III gives the numerical values for the proper sequences, it provides but few clues on the behavior of these counting sequences. A more revealing array is given in Table IV, in which $n=4$. S($r$) denotes the number system whose radix is $r$; S(10) denotes the decimal system, S(2) denotes binary, and S(−2) denotes negabinary.

In each column of Table IV, application of the appropriate counting or sequencing algorithm to the bottom representation should result in the one at the top of the column, with an overflow of one into the next left position. It can now be seen that in the two columns, the digits

TABLE IV

| Negabinary | Binary |
|---|---|
| (i) 3210 | (i) 3210 |
| 1010 | 0000 |
| 1011 | 0001 |
| 1000 | 0010 |
| 1001 | 0011 |
| 1110 | 0100 |
| 1111 | 0101 |
| 1100 | 0110 |
| 1101 | 0111 |
| 0010 | 1000 |
| 0011 | 1001 |
| 0000 | 1010 |
| 0001 | 1011 |
| 0110 | 1100 |
| 0111 | 1101 |
| 0100 | 1110 |
| 0101 | 1111 |
| 11010 | 10000 |

are identical for even $i$, and complementary for odd $i$. Therefore, for odd $i$ in S(−2), the counting algorithm is the same as that for S(2); and for even $i$, the counting algorithm is the inverse of that for S(2), the count operation always causes a change in the low order position, for which $i=0$, (even). The full algorithm, for both up- and down-counting, is given in Table V; $d_{i-1}$ is the next lower-order digit.

TABLE V

| $i$ | Change in $d_{i-1}$ | Change $d_i$ | |
|---|---|---|---|
| | | Up-counting | Down-counting |
| 0 | ---------- | yes | yes |
| odd | 0 to 1<br>0 to 0 | no<br>yes | yes<br>no |
| even | 0 to 1<br>1 to 0 | yes<br>no | no<br>yes |

*Negabinary counters*

The information in Table V can be presented in truth table form for the purpose of synthesizing a computer circuit. The Truth Table for a negabinary up-down counter is given in Table VI; the function obtained from this Truth Table can also be used to design an up-counter and a down-counter.

The $\phi$'s in the last two columns of Table VI indicate that $BC=0$; that is, that a carry-in of −1 and one of +1 cannot occur simultaneously. The B carry-in terminal of the low order stage of a multi-stage counter is used to receive the count-down pulse, while correspondingly the C carry-in terminal of the low-order stage is used to receive the count-up pulse.

TABLE VI

| Variable | Symbol | | Value |
|---|---|---|---|
| | Function | Diagram | |
| Count Digit | A | $A_i$ | 0101 0101 |
| −1 Carry-in | B | $B_i$ | 0011 0011 |
| +1 Carry-in | C | $C_i$ | 0000 1111 |
| Decimal Sum | -------- | -------- | $01\bar{1}0$ 12ØØ |
| Sum Digit | S | $S_i$ | 0110 10ØØ |
| Trigger Signal | T | $T_i$ | 0011 11ØØ |
| −1 Carry-out | $B_{out}$ | $B_{i+1}$ | 0000 01ØØ |
| +1 Carry-out | $C_{out}$ | $C_{i+1}$ | 0010 00ØØ |

The canonical form of the sum-of-products Boolean functions are:

$$S=A\bar{B}\bar{C}+\bar{A}B\bar{C}+\bar{A}\bar{B}C$$
$$B_{out}=A\bar{B}C$$
$$C_{out}=\bar{A}B\bar{C}$$
$$T=\bar{A}B\bar{C}+AB\bar{C}+\bar{A}\bar{B}C+A\bar{B}C$$
$$BC=0$$

The minimized Boolean algebraic functions are:

$$S=A\oplus B\oplus C$$
$$B_{out}=AC$$
$$C_{out}=\bar{A}B$$
$$T=B+C$$

One stage of a negabinary up-down counter which mechanizes these functions by means of AND-OR logic circuit is shown in FIGURE 2C.

In FIGURE 2C, the digit $A_i$ for the *i*th position is stored in register 211. Carry-in signals for +1 and −1 carry-in from the next lower stage are applied respectively to input terminals 232 and 233; if terminals 232 and 233 are used for counting input signals, then the value of −1 for $B_i$ or +1 for $C_i$ must be multiplied by $(-2)i$ to obtain the true numerical value. For example, a pulse applied to terminal 233 of stage $i=1$ has the value +2. Signals representing carry-out signals for +1 and −1 carry-outs to the next higher stage are available at output terminals 234 and 235 respectively. The trigger signal output 236 is applied to the T-input terminal of register 231, which then assumes the new correct state to represent the *i*th digit.

The Boolean functions representing the output of each of the logic circuits shown on FIGURE 2C is as follows:

$234=\bar{A}B$
$235=AC$
$236=B+C$

If the stage under consideration is the high order stage $(i=n-1)$, then the signals $B_n$ and $C_n$ available at output terminals 234 and 235 represent overflow signals for up-counting and down-counting, respectively for an even number of stages, and for down-counting and up-counting respectively, for a counter comprising an odd number of stages. These overflow properties, which are uncomplicated by polarity representations, permit great simplifications in the design of computing elements for digital differential analysers (DDA's).

Examinations of the Boolean functions for $B_{out}$ and $C_{out}$ show that, on up-counting, the low-order stage $(i=0)$ can only have a −1 carry-out (or none); that $i=1$ stage consequently can have only a +1 carry-out (or none); and so on alternately. The carry-out of even stages of an up-counter is thus always $B_{out}=AC$, and of odd stages, $C_{out}=\bar{A}B$. In down-counting, the reverse is true. Counter stages for each of these possibilities are shown in FIGURES 2A and 2B. Since there is only one carry-in input possibility, the trigger signal has the same value as the carry-in signal. An up-counter of four stages, designed in accordance with these principles, is illustrated in FIGURE 2D; a four-stage down-counter is illustrated in FIGURE 2E. The reset signals shown are such as to set two initial numbers to 1010 and 0101, respectively.

QUATERNARY COUNTER

All of the counters previously discussed were negabinary; that is, each circuit was designed to provide for the computation of one digit of a negabinary number. Computation can be speeded up with little or no increase in components or complexity by the use of circuits which compute two negabinary digits. This type of circuit is in effect based on a quaternary system of notation in which the base or radix is positive four. Since the digits of this system are coded by two negabinary digits, the digit values are −2, −1, 0 and +1, respectively, for the negabinary digit pairs 10, 11, 00, and 01. In a counter, each quaternary digit is stored in a pair of flipflops.

Table VII presents the truth table for up-down counting in this system.

TABLE VII

| Variable | Symbol | | Value | | | |
|---|---|---|---|---|---|---|
| | Function | Diagram | | | | |
| Even Digit | $A_0$ | $A_{i,0}$ | 0101 | 0101 | 0101 | 0101 |
| Odd Digit | $A_1$ | $A_{i,1}$ | 0011 | 0011 | 0011 | 0011 |
| −1 Carry-in | B | $B_i$ | 0000 | 1111 | 0000 | 1111 |
| +1 Carry-in | C | $C_i$ | 0000 | 0000 | 1111 | 1111 |
| Decimal Sum | -------- | -------- | $01\bar{2}\bar{1}$ | $\bar{1}0\bar{3}\bar{2}$ | $12\bar{1}0$ | ---- |
| Even Sum Digit | $S_0$ | $S_{i,0}$ | 0101 | 1010 | 1010 | ØØØØ |
| Odd Sum Digit | $S_1$ | $S_{i,1}$ | 0011 | 1001 | 0110 | ØØØØ |
| Even Trigger | $T_0$ | $T_{i,0}$ | 0000 | 1111 | 1111 | ØØØØ |
| Odd Trigger | $T_1$ | $T_{i,1}$ | 0000 | 1010 | 0101 | ØØØØ |
| −1 Carry-out | $B_{out}$ | $B_{i+1}$ | 0000 | 0010 | 0000 | ØØØØ |
| +1 Carry-out | $C_{out}$ | $C_{i+1}$ | 0000 | 0000 | 0100 | ØØØØ |

As in the case of the negabinary counter, the Ø's indicate that $BC=0$; $B_0$ and $C_0$ represent the count-down and count-up signals respectively.

The canonical form of sum-of-products Boolean functions are as follows (the *i*-subscripts are omitted):

$$S_0=A_0A_1\bar{B}\bar{C}+A_0A_1\bar{B}\bar{C}+\bar{A}_0\bar{A}_1BC+\bar{A}_0A_1BC+\bar{A}_0\bar{A}_1BC+\bar{A}_0A_1\bar{B}C$$
$$S_1=\bar{A}_0A_1\bar{B}C+A_0A_1\bar{B}\bar{C}+\bar{A}_0\bar{A}_1B\bar{C}+A_0A_1B\bar{C}+A_0\bar{A}_1\bar{B}C+\bar{A}_0A_1\bar{B}C$$
$$T_0=\bar{A}_0\bar{A}_1B\bar{C}+A_0\bar{A}_1BC+\bar{A}_0A_1B\bar{C}+A_0A_1B\bar{C}+\bar{A}_0\bar{A}_1\bar{B}C+A_0\bar{A}_1\bar{B}C+\bar{A}_0A_1\bar{B}C+A_0A_1\bar{B}C$$
$$T_1=\bar{A}_0\bar{A}_1BC+A_0\bar{A}_1BC+A_0\bar{A}_1\bar{B}C+A_0A_1\bar{B}C$$
$$B_{out}=\bar{A}_0A_1B\bar{C}$$
$$C_{out}=A_0\bar{A}_1\bar{B}C$$
$$BC=0$$

The minimized equations are:

$$S_0=A_0\oplus B\oplus C$$
$$S_1=A_0(A_1\oplus C)+\bar{A}_0(A_1\oplus B)$$
$$T_0=B+C$$
$$T_1=\bar{A}_0B+A_0C$$
$$B_{out}=\bar{A}_0A_1B$$
$$C_{out}=A_0\bar{A}_1C$$
$$BC=0$$

One stage of an up-down quaternary counter using NOR-OR logic elements and R–S–T flipflops, which mechanizes these Boolean functions is illustrated in FIGURE 3C. The negabinary code of two bits for the quaternary digit is stored in flipflop registers 331 and 332.

The Boolean function for the value of the output of each NOR-OR gate in the circuit of FIGURE 3C is as follows:

| | |
|---|---|
| **334**: $\overline{\overline{\bar{A}_0+C}}=$ | $A_0\bar{C}$ |
| **335**: $\overline{A_0+B}=$ | $\bar{A}_0\bar{B}$ |
| **336**: $(\bar{A}_0+C)(A_0+B)=$ | $\bar{A}_0B+A_0C$ |
| **337**: $A_1\bar{A}_0(A_0+B)=$ | $\bar{A}_0A_1B$ |
| **338**: $(\bar{A}_0+C)A_0\bar{A}_1=$ | $A_0\bar{A}_1C$ |
| **339**: $\overline{\overline{B+C}}=$ | $B+C$ |

It will be seen in FIGURE 3C that the input signals $B_i$ and $C_i$ are applied respectively to input terminals 340 and 341. Input signal $B_i$ may be a −1 carry-in from the next lower stage, or it may be a count-down signal, and input signal $C_i$ may be a +1 carry-in from the next lower stage, or it may be a count-up signal. The value of the count signal is +1 or −1 for $C_i$ and $B_i$ respectively, multiplied by ($4^i$); for example, a count pulse applied to terminal 340 of a stage for which $i=2$ would have the value −4. The output of OR circuit 339 is seen to have the value for $T_0$, and is therefore used to trigger flip-flop $A_0$ while $T_1$ is available at the output of NOR circuit 336 to trigger flip-flop $A_1$. Values for $B_{i+1}$ and $C_{i+1}$ are equal to the outputs of NOR circuit 337 and 338 respectively and are available at output terminals 342 and 343 respectively. Information may be read into or from the storage registers $A_0$ and $A_1$ in ways well known to those versed in the art.

It was demonstrated in the case of negabinary counters that up-only or down-only counters could have only one non-zero carry-in or carry-out, and this holds true also in quaternary.

The minimized equations for a quaternary counter stage capable of counting up from −2 to +1, and generating a carry-out signal of +1 in counting up from +1 to −2, are as follows:

$$S_0=A_0\oplus C$$
$$S_1=A_0(A_1\oplus C)+\bar{A}_0A$$
$$T_0=0$$
$$T_1=A_0C$$
$$C_{out}=A_0\bar{A}_1C$$

A quaternary stage which mechanizes these equations is shown in FIGURE 3A. FIGURE 3B shows a quaternary down counter, for which the minimized Boolean functions are:

$$S_0=A_0\oplus B$$
$$S_1=A_0A+\bar{A}_0(A_1\oplus B)$$
$$T_0=B$$
$$T_1=\bar{A}_0B$$
$$B_{out}=\bar{A}_0A_1B$$

*Complementers*

A brief discussion on complementation of negabinary numbers was presented in the co-pending application previously referred to, and the rules for the procedure were also given. The Truth Table is given in Table VIII.

TABLE VIII

| Variable | Symbol | Value |
|---|---|---|
| Operand digit | A | 0101 |
| +1 Carry-in | C | 0011 |
| Decimal Result | ------ | 0$\bar{1}$10 |
| Result Signal | S | 0110 |
| Trigger Signal | T | 0011 |
| +1 Carry-out | $C_{out}$ | 0100 |

The sum-of-product canonical Boolean functions are:

$$S=A\bar{C}+\bar{A}C$$
$$T=\bar{A}C+AC$$
$$C_{out}=A\bar{C}$$

Minimized, these functions become:

$$S=A\oplus C$$
$$T=C$$
$$C_{out}=A\bar{C}$$

A circuit which mechanizes these functions by means of NOR logic elements is shown in FIGURE 4A. It will be noted that four NOR elements are required, with one logic level for the carry-out signal and three for the result digit signal. It will be noted also that the false value of the operand signal rather than the true is required for input.

A complementing circuit making use of NOR and AND logic elements and storage registers is shown in FIGURE 4B. This also has only one level per stage for the carry logic.

*Addition*

The rules for addition of two digits, without a carry, are as follows:

0+0=0
0+1=1
1+1=0, carry−1

With a carry of −1 the rules are:

0+0−1=1, carry +1
0+1−1=0
1+1−1=1

With a carry of +1 the rules are:

0+0+1=1
0+1+1=0, carry −1
1+1+1=1, carry −1

It is clear that a carry of +1 and a carry of −1 cannot both be generated simultaneously. This makes possible a circuit simplification of the Boolean functions for addition, represented by the Boolean function $BC=0$, where B is a carry-in of −1 and C is a carry-in of +1.

This is represented in the truth table for addition, Table IX by ∅, since values here may be either 0 or 1.

TABLE IX

| Variable | Symbol | Carry-In | | | |
|---|---|---|---|---|---|
| | | None | −1 | +1 | Both |
| Augend Digit | A | 0101 | 0101 | 0101 | 0101 |
| Augend Digit | D | 0011 | 0011 | 0011 | 0011 |
| −Carry-In | B | 0000 | 1111 | 0000 | 1111 |
| +Carry-In | C | 0000 | 0000 | 1111 | 1111 |
| Decimal Sum | -------- | 0112 | $\bar{1}$001 | 1223 | ---- |
| Result Digit | S | 0110 | 1001 | 1001 | ∅∅∅∅ |
| Trigger Signal | T | 0011 | 1100 | 1100 | ∅∅∅∅ |
| −Carry-Out | $B_{out}$ | 0001 | 0000 | 0111 | ∅∅∅∅ |
| +Carry-Out | $C_{out}$ | 0000 | 1000 | 0000 | ∅∅∅∅ |

The Boolean algebraic functions for Truth Table IX in canonical sum-of-products form are:

$$S=A\bar{B}\bar{C}\bar{D}+\bar{A}\bar{B}\bar{C}D+\bar{A}B\bar{C}\bar{D}+AB\bar{C}D+\bar{A}BC\bar{D}+A\bar{B}CD$$
$$T=\bar{A}\bar{B}\bar{C}D+A\bar{B}\bar{C}D+\bar{A}B\bar{C}\bar{D}+AB\bar{C}\bar{D}+\bar{A}BC\bar{D}+A\bar{B}C\bar{D}$$
$$B_{out}=A\bar{B}\bar{C}D+A\bar{B}C\bar{D}+\bar{A}\bar{B}CD+A\bar{B}CD$$
$$C_{out}=\bar{A}B\bar{C}\bar{D}$$

After minimization, they are:

$$S = A \oplus (B+C) \oplus D$$
$$T = (B+C) \oplus D$$
$$B_{out} = AC + CD + A\overline{B}D$$
$$C_{out} = \overline{A}B\overline{D}$$

While a circuit to mechanize these functions is readily synthesized by means of AND, OR and NOT logic elements, FIGURE 5 shows a circuit making use of two OR circuits and ten NOR circuits.

In FIGURE 5, the signals $A_i$ (501) and $D_i$ (502) representing the *i*th negabinary digits (the least significant digits are the zero-th digits) of the augend and addend respectively are applied to terminals 503 and 504. The signals $B_i$ (505) and $C_i$ (506) representing the −1 and +1 carry-ins from the next lower stage are applied respectively to input terminals 507 and 508; and corresponding carry-outs $B_{i+1}$ (514) and $C_{i+1}$ (513) at output terminals 516 and 515. The result function output $Sum_i$ (510) and its complement $\overline{Sum}_i$ (509) are available at terminals 512 and 511 respectively. It should be noted that OR circuit 523 can be eliminated by bundling the input signals available at terminals 507 and 508 at NOR circuits 524, 525 and 527. "Bundling" is described on pages 128 and 129 of the book "The Logical Design of Transistor Digital Computers," by Gerald A. Maley and John Earle, published in 1963 by Prentice-Hall, Inc.

The NOR circuit 521 is considered as a single NOR circuit, for purposes of identification, while NOR circuits 524 and 525 comprise a pair and NOR circuits 527, 528 and 529 comprise a triplet or triad.

The Boolean functions representing the output of each of the logic elements in FIGURE 5 are as follows:

| | | |
|---|---|---|
| **521**: | $\overline{A+D}=$ | $\overline{A}\overline{D}$ |
| **522**: | $\overline{B}$ | |
| **523**: | $B+C$ | |
| **524**: | $\overline{A+B+C+\overline{D}}=$ | $\overline{A}\overline{B}\overline{C}D$ |
| **525**: | $\overline{\overline{A}+B+C+D}=$ | $A\overline{B}\overline{C}\overline{D}$ |
| **526**: | $\overline{A+\overline{B}+D}=$ | $\overline{A}B\overline{D}=+1$ carry out |
| **527**: | $\overline{(A\oplus D+B+C}=$ | $(\overline{A\oplus D})(\overline{B+C})$ |
| **528**: | $\overline{A+\overline{B+C}+\overline{D}}=$ | $\overline{A}(B+C)D$ |
| **529**: | $\overline{\overline{A}+\overline{B+C}+D}=$ | $A(B+C)\overline{D}$ |
| **530**: | $(AC+AD+CD)\overline{B}=$ | −1 carry out |
| **531**: | $A\oplus(B+C)\oplus D=$ | Sum Digit |
| **532**: | $\overline{A\oplus(B+C)\oplus D}=$ | Complement of sum digit |

If the complement of the sum digit is not required, OR circuit 532 may be deleted. This and other minor variations to the circuit will come readily to the mind of those skilled in the art; such variations are considered to be within the spirit and scope of the present invention.

Examples follow of negabinary addition such as would be performed by eight stages of an adder such as that illustrated in FIGURE 5. Numbers below the sum line represent overflow positions.

| | | |
|---|---|---|
| A | 1010 0010 | −162 |
| D | +0110 1111 | +(+27) |
| S | 1000 1000 | −135 |
| | 1011 1010 | −154 |
| | +0011 1111 | +(−21) |
| S | 0101 0001 | +81 |
| Overflow 11 | | −256 |
| | True Sum | −175 |

Since 1, 0, and −1 are possible carries, a carry-out of the high order stage of either +1 or −1 represents an overflow condition. With the radix point at the extreme right, an overflow of either +1 (01) or −1 (11) means the register is storing an incorrect result which differs from the correct one by the value of the overflow times $(-2)^n$. For $n=8$, $(-2)^n$ is +256.

*Subtraction*

As in addition, subtraction results in true representation regardless of the magnitudes and polarities of the operands, and overflow is handled by shifting and scaling accordingly. Subtraction can be accomplished by adding the arithmetic complement of the subtrahend. One of the complementing circuits previously described can be used for this, so as to form with the adder, the arithmetic function $S=A+(-D)=A-D$.

Following the pattern used in addition, the rules for subtraction in negabinary are as follows:

No carry:

0−0=0
0−1=1, carry +1
1−0=1
1−1=0

+ Carry:

0−0+1=1
0−1+1=0
1−0+1=0, carry −1
1−1+1=1

− Carry:

0−0−1=1, carry +1
0−1−1=0, carry +1
1−0−1=0
1−1−1=1, carry +1

These rules are summarized in Table X. As in the case of addition, $BC=0$.

TABLE X

| Variable | Symbol | Binary Value | | | |
|---|---|---|---|---|---|
| | | No Carry | −1 | +1 | Both |
| Minuend Digit | A | 0101 | 0101 | 0101 | 0101 |
| Subtrahend Digit | D | 0011 | 0011 | 0011 | 0011 |
| −Carry-In | B | 0000 | 1111 | 0000 | 1111 |
| +Carry-In | C | 0000 | 0000 | 1111 | 1111 |
| Decimal Difference | ------ | $01\overline{1}0$ | $\overline{1}0\overline{2}\overline{1}$ | 1201 | ---- |
| Result Digit | S | 0110 | 1001 | 1001 | ØØØØ |
| Trigger Signal | T | 0011 | 1100 | 1100 | ØØØØ |
| −Carry-Out | $B_{out}$ | 0000 | 0000 | 0100 | ØØØØ |
| +Carry-Out | $C_{out}$ | 0010 | 1011 | 0000 | ØØØØ |

Comparison of Table X with Table IX for addition will show that the functions for S and T are identical for addition and subtraction, and hence are described by the identical Boolean functions. The sum-of-products canonical forms for the carry-out functions are as follows:

$$B_{out} = A\overline{B}C\overline{D}$$
$$C_{out} = \overline{A}B\overline{C}D + \overline{A}B\overline{C}\overline{D} + \overline{A}B\overline{C}D + AB\overline{C}D$$

After minimization, these are:

$$B_{out} = AC\overline{D}$$
$$C_{out} = \overline{A}B + BD + \overline{A}\overline{C}D$$

While many different circuits may be synthesized from these Boolean functions, the circuit previously described for negabinary addition and illustrated in FIGURE 5 may be used, provided that certain changes are made in labeling the input and output terminals. These changes are given in the brackets in FIGURE 5, and are as follows:

| Terminal: | Signal |
|---|---|
| **512** | $\overline{A}_i$ in lieu of $A_i$ (complement of minuend in lieu of augend). |
| **503** | $C_i$ in lieu of $B_i$. |
| **507** | $B_i$ in lieu of $C_i$. |
| **508** | $B_{i+1}$ in lieu of $C_{i+1}$. |
| **515** | $C_{i+1}$ in lieu of $B_{i+1}$. |
| **516** | $Dif_i$ in lieu of $\overline{Sum}_i$. |
| **511** | $\overline{Dif}_i$ in lieu of $Sum_i$. |

Considering the bracketed labels in FIGURE 5, the signal [$A_i$] (501) representing the complement of the *i*th negabinary digit of the minuend and [D] (502) representing the *i*th negabinary digit of the subtrahend are applied to terminals 503 and 504. The signals $[C_i]$ (505) and $[B_i]$ (506) representing +1 and −1 carry-ins from the next lower stage are applied respectively to input terminals 507 and 508. The result function output $[Dif_i]$ (509) and its complement $[\overline{Dif_i}]$ (510) are available at output terminals 511 and 512 respectively. The carry-out signals for +1, $[C_{i+1}]$ (514), is available at output terminal 516; that for −1, $[B_{i+1}]$ (513), at 515.

That the same circuit may be used for both negabinary addition and subtraction is easily demonstrated by interchanging S and $\overline{S}$, A and $\overline{A}$, and B and C, in the Boolean functions for addition. This gives:

$$\overline{S}=\overline{A}\oplus(C+B)\oplus D=\overline{A}\oplus\overline{(B+D)}\oplus\overline{D}$$

$$T=(C+B)\oplus D$$

$$C_{out}=\overline{A}B+BD+\overline{A}\overline{C}D$$

$$B_{out}=AC\overline{D}$$

These will be seen to be precisely the Boolean functions for negabinary subtraction. The output of each of the logic elements of the circuit as previously given for addition may be similarly transformed to give the corresponding output for subtraction.

An example of negabinary subtraction follows:

| | | |
|---|---|---|
| A | 0111 1000 | +40 |
| D | −1011 0011 | −(−145) |
| S | 1100 1001 | −71 |
| Overflow 1 | | +256 |
| | True Value | +185 |

The discussion of overflow given for addition is applicable as well to subtraction. However, in the circuit of FIGURE 5, care must be exercised in the interpretation of the overflow signals available at carry-out output terminals 515 and 516 of the highest-order stage, which depends on whether the circuit is being used for addition or subtraction (B and C are interchanged).

This property of the adder circuit to be used as a subtractor is potentially of great utility in a DDA, which patchboard wiring can be used to make an integrator have a true or arithmetic complement output.

*Co-Addition*

A half-coadder is illustrated in FIG. 7A. It is a logic circuit rather than an arithmetic circuit and is so called because two such circuits arranged with an OR circuit as illustrated in FIG. 7C perform the arithmetic operation of co-addition on a pair of digits of two negative binary operands. This operation may be defined as that which produces the additive inverse of the sum of the operands, or R in the definition $R=-(A+B)$. Full coadder circuits may, in turn, be aranged in combination to perform addition, subtraction, or any combination of addition and subtraction on a plurality of operands, as disclosed in my co-pending application Ser. No. 389,760.

Another embodiment of a full negabinary co-adder circuit is shown in FIG. 7B, wherein a conventional binary half-adder and a half-subtractor are used in combination with an OR circuit.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. Negative binary digital arithmetic system for adding or subtracting a pair of numerical values each represented by plural negative binary input signals ranging in sequence to represent negative binary digits from most significant to least significant orders, comprising a plurality of arithmetic circuits each having control input terminals for receiving an "Add" control signal and a "Sub" control signal, digit input terminals for receiving digit signals "A" and "D" representing negative binary digits of one order and carry input terminals for receiving carry signals "B" and "C" from the next lower order, each of said arithmetic circuits including means for producing resultant output signals "Dif" and "Sum" representative of the difference digit or the sum digit of the received negative binary input signals and carry signals "$B_{out}$" and "$C_{out}$," and means for connecting the said arithmetic circuits in a serial sequence in which the carry signals from each arithmetic circuit are applied to the carry terminals of the next order arithmetic circuit, said signal-producing means satisfying the Boolean functions:

$$\text{Dif}=\overline{[(A\cdot\text{Add}+\overline{A}\cdot\text{Sub})\oplus(B+C)\oplus D]}\cdot\text{Sub}$$

$$\text{Sum}=[(A\cdot\text{Add}+\overline{A}\cdot\text{Sub})\oplus(B+C)\oplus D]\cdot\text{Add}$$

$$B_{out}=(A\cdot\text{Add}+\overline{A}\cdot\text{Sub})\cdot C+C\cdot D+(A\cdot\text{Add}+\overline{A}\cdot\text{Sub})\cdot\overline{B}\cdot D$$

$$C_{out}=\overline{(A\cdot\text{Add}+\overline{A}\cdot\text{Sub})}\cdot B\cdot\overline{D}$$

where the dot (·) signifies the logical AND function, the plus sign (+) signifies the logical OR function, and the bar (—) indicates the logical inverse of a variable, and ⊕ signifies the logical EXCLUSIVE OR function.

2. The apparatus according to claim 1, wherein said system is extended by two arithmetic circuits in addition to those required for said orders, each of which comprises one overflow stage of an overflow network.

3. The apparatus according to claim 1, wherein said signal-producing means comprises a first NOR circuit, a second NOR circuit connected to said first NOR circuit and to said digit input terminals, a third NOR circuit connected to said digit input terminals, an OR circuit connected to said carry input terminals, a pair of NOR circuits each connected to one of said digit input terminals and to said OR and third NOR circuits, a NOR circuit connected to one of said carry input terminals and to said third and said pair of NOR circuits and producing a carry signal, a triad of NOR circuits one of which is connected to said OR circuit and said pair of NOR circuits, second of said triad is connected to one of said digit input terminals and to said third and one of said pair of NOR circuits, and the last of said triad is connected to the other of said digit input terminals and to said third and other of said pair of NOR circuits, and an OR and a NOR circuit each connected to each of said triad and producing said resultant output signals.

4. A full negabinary complementary adder comprising a pair of identical half co-adders each producing output signals, input terminals for receiving input signals representative of corresponding operand digits and a carry-in signal from a lower order, means for producing a carry-out signal in response to signals received from each of said half co-adders, one of said half co-adders producing an output signal representative of the co-sum digit in response to the said carry-in signal and a signal from other of said half co-adders.

5. A full negabinary complementary adder comprising a binary half adder and a binary half subtractor each producing output signals, input terminals for receiving digit input signals and a carry-in signal from a lower order, means for producing a carry-out signal in response to signals received from the said half adder and half subtractor, the said half subtractor producing an output signal representative of the co-sum digit in response to the said carry-in signal and a signal from the said half adder.

References Cited

UNITED STATES PATENTS

| | | | |
|---|---|---|---|
| 3,081,032 | 3/1963 | Keir et al. | 235—175 |
| 3,300,628 | 1/1967 | Coates et al. | 235—173 |

MALCOLM A. MORRISON, *Primary Examiner.*

K. MILDE, V. SIBER, *Assistant Examiners.*